(12) United States Patent
Hwang et al.

(10) Patent No.: US 11,119,191 B2
(45) Date of Patent: Sep. 14, 2021

(54) LIDAR SYSTEM AND METHOD OF DRIVING THE SAME

(71) Applicant: SAMSUNG ELECTRONICS CO., LTD., Suwon-si (KR)

(72) Inventors: Inoh Hwang, Seongnam-si (KR); Dongjae Shin, Seoul (KR); Jungwoo Kim, Hwaseong-si (KR); Junghyun Park, Seoul (KR); Byunggil Jeong, Anyang-si (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 569 days.

(21) Appl. No.: 15/861,245

(22) Filed: Jan. 3, 2018

(65) Prior Publication Data
US 2019/0025408 A1      Jan. 24, 2019

(30) Foreign Application Priority Data
Jul. 24, 2017   (KR) .................. 10-2017-0093689

(51) Int. Cl.
*G01S 7/48* (2006.01)
*G02F 1/29* (2006.01)
(Continued)

(52) U.S. Cl.
CPC ............ *G01S 7/4808* (2013.01); *G01S 7/003* (2013.01); *G01S 7/4865* (2013.01); *G01S 17/06* (2013.01);
(Continued)

(58) Field of Classification Search
CPC ...... G01S 7/4808; G01S 7/003; G01S 7/4865; G01S 17/06; G01S 17/10; G01S 17/89;
(Continued)

(56) References Cited

U.S. PATENT DOCUMENTS

| 5,151,814 A | 9/1992 | Grinberg et al. |
| 6,456,419 B1 * | 9/2002 | Winker ............. G02B 27/0087 250/227.17 |

(Continued)

FOREIGN PATENT DOCUMENTS

| KR | 10-2017-0007031 A | 1/2017 |
| WO | 2007/053478 A2 | 5/2007 |

(Continued)

OTHER PUBLICATIONS

Communication dated Nov. 8, 2018 issued by the European Patent Office in counterpart European Application No. 18163152.4.

*Primary Examiner* — Hovhannes Baghdasaryan
(74) *Attorney, Agent, or Firm* — Sughrue Mion, PLLC

(57) ABSTRACT

A light detection and ranging (LiDAR) system is provided including a beam steering device configured to modulate a phase of light from a light source and to output light in a plurality of directions at the same time, a receiver including a plurality of light detection elements configured to receive light that has been irradiated onto an object in the plurality of directions from the beam steering device and reflected from the object, and a processor configured to analyze position-specific distribution and/or time-specific distribution of light received by the receiver and to individually process the light lights irradiated onto the object in the plurality of directions.

7 Claims, 11 Drawing Sheets

(51) Int. Cl.
*G02B 27/00* (2006.01)
*G01S 7/00* (2006.01)
*G02B 26/10* (2006.01)
*G01S 17/06* (2006.01)
*G01S 7/4865* (2020.01)
*G01S 17/10* (2020.01)
*G11B 7/2433* (2013.01)
*G02F 1/01* (2006.01)
*G01S 17/89* (2020.01)

(52) U.S. Cl.
CPC .............. *G01S 17/10* (2013.01); *G01S 17/89* (2013.01); *G02B 26/10* (2013.01); *G02B 27/0087* (2013.01); *G02F 1/0126* (2013.01); *G02F 1/292* (2013.01); *G11B 7/2433* (2013.01); *G02F 2202/30* (2013.01); *G02F 2203/50* (2013.01)

(58) Field of Classification Search
CPC .. G02B 26/10; G02B 27/0087; G02B 1/0126; G02B 1/292; G02B 7/2433; G02B 2202/30; G02B 2203/50
See application file for complete search history.

(56) References Cited

U.S. PATENT DOCUMENTS

| | | | |
|---|---|---|---|
| 2003/0179804 A1 | 9/2003 | Cook et al. | |
| 2010/0030076 A1* | 2/2010 | Vortman | A61N 7/02 |
| | | | 600/439 |
| 2010/0182587 A1* | 7/2010 | Fluckiger | G01S 7/4814 |
| | | | 356/4.01 |
| 2015/0069216 A1 | 3/2015 | Hutchin | |
| 2015/0116799 A1* | 4/2015 | Someno | G03H 1/02 |
| | | | 359/9 |
| 2015/0378241 A1 | 12/2015 | Eldada | |
| 2016/0161600 A1 | 6/2016 | Eldada et al. | |
| 2017/0184450 A1 | 6/2017 | Doylend et al. | |
| 2017/0328990 A1* | 11/2017 | Magee | G01S 17/42 |
| 2017/0363740 A1* | 12/2017 | Kubota | G01S 7/484 |
| 2018/0074382 A1* | 3/2018 | Lee | G02F 1/0018 |
| 2018/0120422 A1* | 5/2018 | Fujita | G02F 1/2955 |

FOREIGN PATENT DOCUMENTS

| | | | | |
|---|---|---|---|---|
| WO | WO-2007053478 A2 * | 5/2007 | ............ | H01Q 23/00 |
| WO | 2011/074092 A1 | 6/2011 | | |

* cited by examiner

LIDAR SYSTEM AND METHOD OF DRIVING THE SAME

CROSS-REFERENCE TO RELATED APPLICATION

This application claims priority from Korean Patent Application No. 10-2017-0093689, filed on Jul. 24, 2017, in the Korean Intellectual Property Office, the disclosure of which is incorporated herein in its entirety by reference.

BACKGROUND

1. Field

Apparatuses and methods consistent with exemplary embodiments relate to a light detection and ranging (LiDAR) system and a method of driving the same.

2. Description of the Related Art

Recently, light detection and ranging (LiDAR) systems have been used as sensors or scanners for detecting an obstacle in various autonomous driving device fields such as smart vehicles, robots, and so forth.

A LiDAR system may generally include a beam steering device for irradiating laser light onto a target position. As a beam steering device, an optical phased array (OPA) may be used for steering a beam at a specific angle, by using interference among light output from respective channels, by applying a constant phase difference between adjacent channels.

In an OPA, due to driving principles thereof, addition to a main lobe emitted in an intended direction, a side lobe may also be generated and emitted in a direction other than the intended direction due to high-order diffracted light. The side lobe acts as noise, and lowers a signal-to-noise ratio (SNR), degrading the overall efficiency of a system.

SUMMARY

One or more exemplary embodiments may provide a LiDAR system having improved efficiency and a method of driving the LiDAR system.

Additional exemplary aspects and benefits will be set forth in part in the description which follows and, in part, will be apparent from the description, or may be learned by practice of the presented exemplary embodiments.

According to an aspect of an exemplary embodiment, a light detection and ranging (LiDAR) system includes a beam steering device configured to modulate a phase of light from the light source and to output light in a plurality of directions at the same time, a receiver including a plurality of light detection elements configured to receive light that is irradiated onto an object in the plurality of directions from the beam steering device and reflected from the object, and a processor configured to analyze position-specific distribution and/or time-specific distribution of light received by the receiver and to separately process the light irradiated onto the object from the plurality of directions.

The processor may control the beam steering device to scan the object along a plurality of scanning directions at the same time based on an adjustment of each of the plurality of directions.

The beam steering device may include an optical phased array (OPA) including a plurality of channels that modulate a phase of incident light and a signal input unit that applies a modulation signal to each of the plurality of channels.

The processor may further include a phase setter configured to configure a phase profile to be implemented by the OPA and to control the signal input unit based on the phase profile to form the plurality of directions.

The plurality of directions may be determined from among directions of 0-order light, ±1-order light, ..., ±n-order light (n is a natural number) output from the OPA.

The processor may be further configured to correct and process a light amount, received by the receiver, of light having a low intensity from among the light irradiated in the plurality of directions.

The processor may be further configured to correct and process a light amount, received by the receiver, of light having a high order from among the light irradiated in the plurality of directions.

The OPA may include an active layer having an optical property that changes according to an electric signal applied thereto and a plurality of meta devices including nano structures of sub wavelengths located adjacent to the active layer.

The OPA may include a light waveguide that splits input light to a plurality of paths and outputs the light through a plurality of output ends, and a phase retarder that adjusts phase delay of each of the plurality of paths.

The phase setter may be further configured to configure a binary phase profile in which the plurality of directions are two directions in which +1-order light and −1-order light output from the OPA are directed, respectively.

The phase setter may be further configured to configure a binary phase profile in which a phase value implemented in the plurality of channels of the beam steering device is one of a first phase value $\varphi_1$ and a second phase value $\varphi_2$.

The phase setter may be further configured to configure the binary phase profile by arranging the first phase value $\varphi_1$ and the second phase value $\varphi_2$ in a quasi-periodic manner as many times as the number of channels and to allocating the first phase value $\varphi_1$ and the second phase value $\varphi_2$ in an order in which the plurality of channels are arranged.

The phase setter may be further configured to configure the binary phase profile by repeating a process of setting the first phase value $\varphi_1$ for one or more channels located in adjacent to each other from among the plurality of channels and setting the second phase value $\varphi_2$ for next one or more channels located in adjacent to each such that an average value of periods in which an arranged pattern of the first phase value $\varphi_1$ and the second phase value $\varphi_2$ is repeated satisfies a predetermined value.

The phase setter may be further configured to configure the binary phase profile such that the two directions are determined by angles θ and −θ defined by $$\sin\theta = \frac{\lambda}{\langle T_k \rangle}$$

wherein λ is a wavelength of incident light, $T_k$ is a $k^{th}$ period in which the arranged pattern of the first phase value $\varphi_1$ and the second phase value $\varphi_2$ is repeated, and $\langle T_k \rangle$ is an average value of the periods.

The phase setter may be further configured to configure the binary phase profile by configuring a full phase profile that uses an entire phase value range from 0 to $2\pi$ such that a direction of the +1-order light becomes a desired direction, and modifying each of phase values of the full phase profile into one of the first phase value $\varphi_1$ and the second phase value $\varphi_2$.

The phase setter may be further configured to configure the binary phase profile by modifying phase values in a set range from among phase values of the full phase profile into the first phase value $\varphi_1$ and phase values beyond the set range into the second phase value $\varphi_2$.

A difference between the first phase value $\varphi_1$ and the second phase value $\varphi_2$ may be $\pi$.

According to an aspect of another exemplary embodiment, a method of driving a light detection and ranging (LiDAR) system includes controlling a beam steering device to cause light to scan an object simultaneously in a plurality of scanning directions, receiving light reflected from the object, and separately processing a signal received by the light in irradiated in each of the plurality of scanning directions.

The controlling of the beam steering device may include using an optical phase array (OPA) including a plurality of channels, each of which is configured to modulate a phase of light incident thereon and causing light, selected from among directions of 0-order light, ±1-order light, . . . , ±n-order light (n is a natural number) output from the OPA to scan the object.

The controlling of the beam steering device may include causing +1-order light and −1-order light output from the OPA to scan the object.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Figure 1:
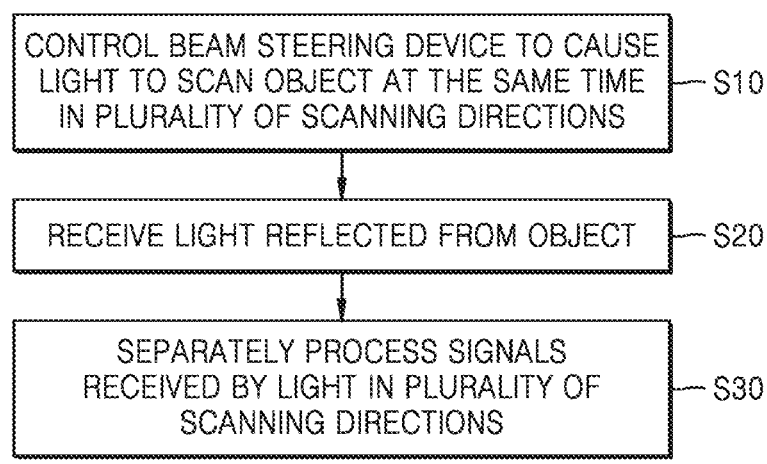
FIG. 1 is a flowchart schematically illustrating a method of driving a light detection and ranging (LiDAR) system according to an exemplary embodiment.

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Throughout the drawings, each element may be exaggerated in size for clarity and convenience of a description. Meanwhile, the following exemplary embodiments are merely illustrative, and various modifications may be possible from the exemplary embodiments.

An expression such as "above" or "on" may include not only the meaning of "immediately on in a contact manner", but also the meaning of "on in a non-contact manner".

The singular forms are intended to include the plural forms as well, unless the context clearly indicates otherwise. If it is assumed that a certain part includes a certain component, the term 'including' means that a corresponding component may further include other components unless a specific meaning opposed to the corresponding component is written.

The use of "the" and other demonstratives similar thereto may correspond to both a singular form and a plural form.

Unless the order of operations of a method is explicitly mentioned or described otherwise, the operations may be performed in a proper order. The order of the operations is not limited to the order the operations are mentioned. The use of all examples or exemplary terms (e.g., "etc.,", "and (or) the like", and "and so forth") is merely intended to describe technical spirit in detail, and the scope is not necessarily limited by the examples or exemplary terms unless defined by the claims.

FIG. 1 is a flowchart schematically illustrating a method of driving a light detection and ranging (LiDAR) system according to an exemplary embodiment.

According to a method of driving a LiDAR system of an exemplary embodiment, the LiDAR system scans an object simultaneously from a plurality of scanning directions and processes the results separately in the receiver, so that information about the object may be obtained quickly.

To this end, a beam steering device is controlled cause light to scan an object simultaneously from a plurality of scanning directions in operation S10.

The beam steering device aims light from a light source toward an object and scans the object, and is capable of controlling the direction of the light. In the method of driving a LiDAR system according to an exemplary embodiment, the beam steering device controls a plurality of aiming angles at the same time, and by controlling the plurality of aiming angles, respectively, a plurality of scanning lines are formed on the object. The plurality of aiming angles may include light at an angle intended by the design of the beam steering device, that is, a main lobe, and light at another angle, that is, a side lobe.

For example, the beam steering device may be implemented with an optical phased array (OPA) including a plurality of channels that respectively modulate the phase of incident light differently, in which light, selected from among 0-order light, ±1-order light, . . . , ±n-order light (n is a natural number) output from the OPA may scan an object. Alternatively, +1-order light and −1-order light irradiated from the OPA may scan the object.

After light emitted from the beam steering device is irradiated onto the object, the light reflected from the object is received by the receiver in operation S20.

The receiver may include an array of a plurality of light detection elements that sense light. Since light is simultaneously irradiated toward the object in two directions, a predetermined space distribution may be formed in the receiver when the light reflected from the object is detected by the receiver. Alternatively, the reflected lights may be detected by the receiver with a time difference depending on a shape of the object.

Based on the light detected by the receiver, signals corresponding to the light irradiated in the plurality of scanning directions are processed separately in operation S30. For the separation, position-specific distribution or time-specific distribution of the light detected by the receiver may be considered.

An exemplary structure of a LiDAR system that performs the above-described processes will be described.

Figure 2:
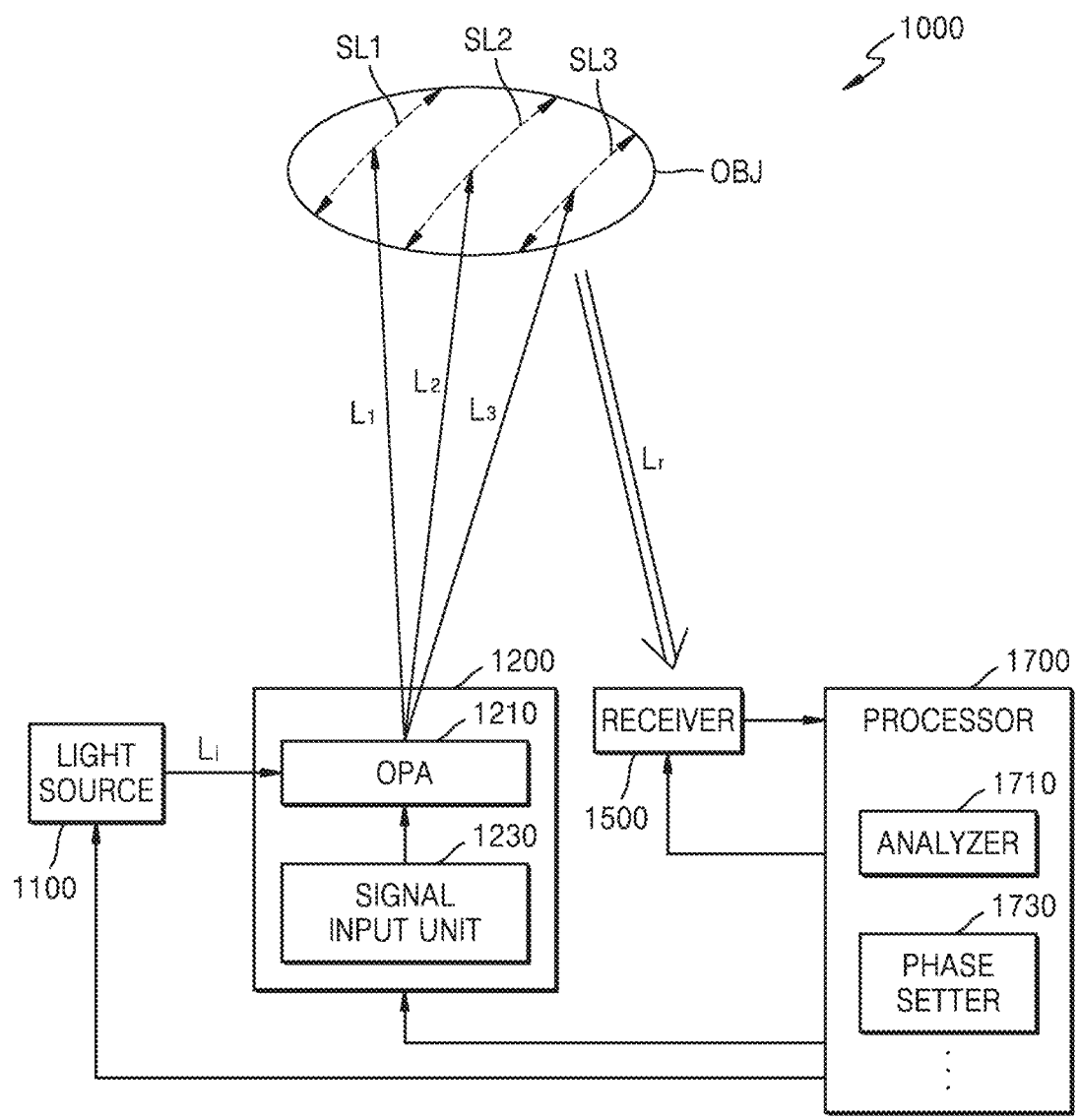
FIG. 2 is a block diagram illustrating a schematic structure of a LiDAR system according to an exemplary embodiment.
Figure 3:
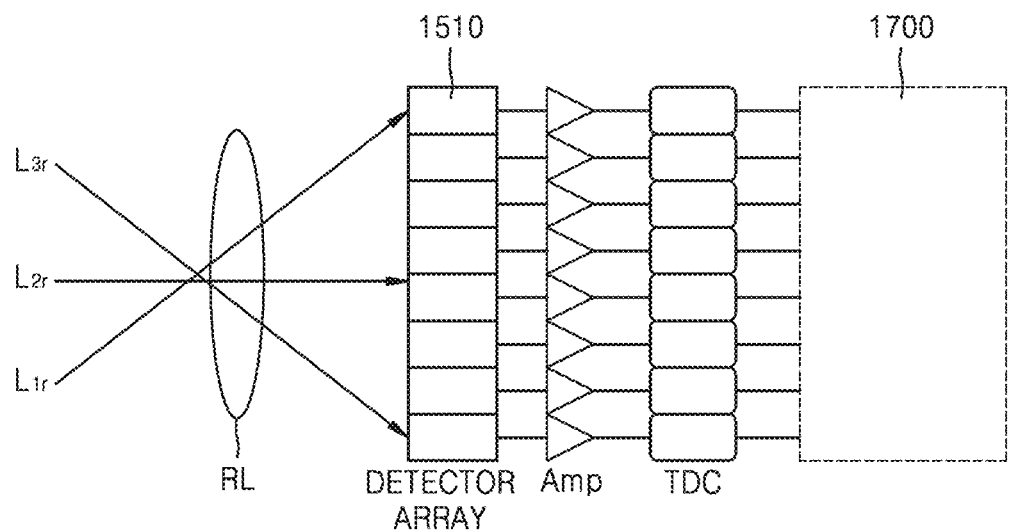
FIG. 3 is a block diagram illustrating a schematic circuit structure of a receiver included in the LiDAR system illustrated in FIG. 2.
Figure 4:
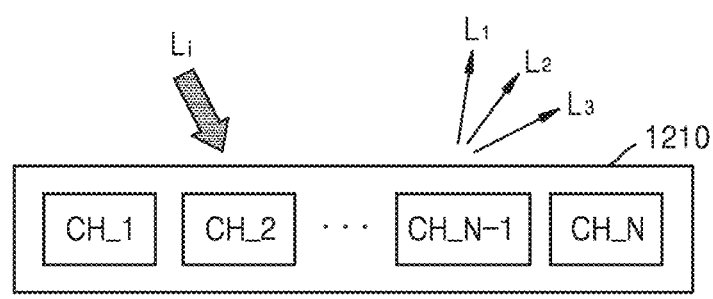
FIG. 4 is a conceptual diagram for describing modulation of incident light by an optical phased array (OPA) employed in the LiDAR system illustrated in FIG. 2.

FIG. 2 is a block diagram schematically showing a structure of a LiDAR system 1000 according to an exemplary embodiment, FIG. 3 is a block diagram of a circuit configuration of a receiver 1500 included in the LiDAR system 1000 of FIG. 2, and FIG. 4 is a conceptual view for describing that an OPA employed in the LiDAR system 1000 of FIG. 2 modulates incident light.

The LiDAR system 1000 may include a light source 1100, a beam steering device 1200 that modulates a phase of light coming from the light source 1100 and irradiates light toward an object OBJ in a plurality of directions, the receiver 1500 that receives light reflected from the object OBJ, and a processor 1700 that analyzes position-specific distribution and/or time-specific distribution of light received from the receiver 1500 and identifies and processes the light irradiated onto the object OBJ in the plurality of directions and reflected from the object.

The light source 1100 irradiates light to be used for the analysis of a location and a shape of the object OBJ. The light source 1100 may include a light source such as a laser diode (LD), a light-emitting diode (LED), a super luminescent diode (SLD), or the like, which generates and irradiates light having a wavelength, for example a wavelength band suitable for the analysis of the position and the shape of the object OBJ. The light generated may be light having an infrared band wavelength. The light source 1100 may generate and irradiate light in a plurality of different wavelength bands. The light source 1100 may generate and irradiate pulsed light or continuous light.

The beam steering device 1200 may include an OPA 1210 including a plurality of channels, each of which modulates a phase of incident light, and a signal input unit 1230 that applies a modulation signal to each of the plurality of channels.

Referring to FIG. 4, the OPA 1210 may include a plurality of channels CH_1, CH_2, . . . , CH_N−1, CH_N. The plurality of channels CH_1, CH_2, . . . , CH_N−1, CH_N are controlled to independently modulate a phase of incident light Li, and a signal is applied from the signal input unit 1230 to each of the plurality of channels CH_1, CH_2, . . . , CH_N−1, CH_N, such that a phase profile of the light modulated by the plurality of channels CH_1, CH_2, . . . , CH_N−1, CH_N satisfies a modulation-light condition. The modulation-light condition may be an angle for aiming the incident light Li toward the object OBJ, and in an exemplary embodiment, respective signals applied to the plurality of channels CH_1, CH_2, . . . , CH_N−1, CH_N may be controlled such that the OPA 1210 irradiates light $L_1$, $L_2$, and $L_3$ aimed toward the object OBJ at different angles. Although the light $L_1$, $L_2$, and $L_3$ is shown as three beams, this is merely an example and the present disclosure is not limited to this example. For example, the plurality of directions may be selected from among directions of 0-order light, ±1-order light, . . . , ±n-order light (n is a natural number) output from the OPA 1210. The plurality of directions may be two directions in which +1-order light and −1-order light irradiated from the OPA 1210 are directed.

The beam steering device 1200 is controlled by the processor 1700, and the light $L_1$, $L_2$, and $L_3$ directed in the plurality of directions is controlled, respectively, such that the object OBJ may be scanned in a plurality of scanning directions SL1, SL2, and SL3 at the same time. Thus, the speed of scanning the object OBJ increases.

The receiver 1500 may include an array of a plurality of light detection elements that sense reflected light $L_r$ reflected from the object OBJ.

The processor 1700 controls operations of the LiDAR system 1000.

The processor 1700 may include an analyzer 1710 that analyzes a position-specific distribution and/or a time-specific distribution of light received by the receiver 1500 and identifies and processes the light irradiated onto the object OBJ in the plurality of directions from the beam steering device 1200, and reflected from the object.

The processor 1700 may include a phase setter 1730 that sets a phase profile to be implemented by the OPA 1210 and controls the signal input unit 1230 based on the phase profile, so as to output light from the beam steering device 1200 in a plurality of directions.

The processor 1700 controls operations of the light source 1100 and the receiver 1500. For example, the processor 1700 may perform power supply control, on/off control, pulsed wave (PW) or continuous wave (CW) generation control, and so forth with respect to the light source 1100. The processor 1700 may also apply a control signal to each of the light detection elements of the receiver 1500.

As shown in FIGS. 2 and 3, reflected light $L_{1r}$, $L_{2r}$, and $L_{3r}$, which is the irradiated light $L_1$, $L_2$, and $L_3$, as reflected from the object OBJ, passes through a light-receiving lens RL and then are detected by a plurality of light detection elements 1510 located in different positions of a detector array. Each signal may be amplified while passing through an amplifier AMP connected to each light detection element 1510, and is converted into distance information by a time-to-digital converter (TDC). For example, each of a plurality of TDCs may be separately connected to an AMP, or at least one TDC may be connected to all of the AMPs.

Once the processor 1700 determines an angle at which the object OBJ is to be scanned, the phase setter 1730 sets a phase to enable steering of light in this direction, and the processor 1700 controls the OPA 1210 through the signal input unit 1230. In this case, irradiation angles of a +1-order beam and a −1-order beam may be determined based on an irradiation angle of a 0-order beam, or the irradiation angle of the −1-order beam may be determined based on the irradiation angle of the +1-order beam, and this information may be delivered to the analyzer 1710 for use in analysis.

The light $L_1$, $L_2$, and $L_3$, reflected from the object OBJ after simultaneously being irradiated onto the object OBJ by the beam steering device 1200, passes through the light-receiving lens RL and then is detected by the light detection elements 1510 at different positions in the detector array. Each signal is amplified while passing through an AMP, and is then converted into distance information through a TDC.

The analyzer 1710 determines the plurality of light detection elements 1510 of the detector array, which correspond to irradiation angle information, respectively, and analyzes distance information of each TDC connected to the corresponding light detection element 1510, thus mapping distance information to a position corresponding to an angle.

The analyzer 1710 may correct and process a light amount, received by the receiver 1500, of light having a relatively low intensity, among the light irradiated onto the object OBJ in the plurality of directions, and reflected from the object OBJ. That is, a light amount, received by the receiver 1500, via the object OBJ, of light having a low intensity among the light irradiated in the plurality of directions and reflected from the object OBJ, may be amplified. The analyzer 1710 may correct and process a light amount, received by the receiver 1500, of light having a high order, from among the light irradiated onto the object OBJ in the plurality of directions, and reflected by the object OBJ.

The analyzer 1710 may analyze a received light signal to analyze the existence, position, shape, physical property, etc., of the object OBJ. The analyzer 1710 may perform an operation for, for example, a time of flight measurement, and identify a three-dimensional (3D) shape of the object OBJ based on the calculation or may perform a physical property analysis using Raman analysis.

The analyzer 1710 may use any of various operation methods. For example, direct time measurement irradiates pulsed light onto the object OBJ and measures the time of arrival of the light after being reflected from the object OBJ by using a timer, thus calculating a distance. Correlation irradiates the pulsed light onto the object OBJ and measures the distance from a brightness of the light reflected from the object OBJ. Phase delay measurement irradiates light having a continuous wave, such as a sine wave, onto the object OBJ, and senses a phase difference of the light reflected from the object OBJ, thus converting the phase difference into the distance.

The analyzer 1710 may also analyze a type, an ingredient, a concentration, a physical property, etc., of the object OBJ by using a Raman analysis that detects wavelength shift caused by the object OBJ.

The analyzer 1710 transmits an operation result, that is, information about the shape, location, and physical property of the object OBJ, to another unit. For example, the information may be transmitted to an autonomous driving device that uses information about a 3D shape, operation, and location of the object OBJ. The information may also be transmitted to medical equipment using a physical property information of the object OBJ, e.g., biometric information. Another unit to which the operation result is transmitted may be a display device or a printer. Alternately, the other unit may also be, but not limited to, a smart phone, a cellular phone, a personal digital assistant (PDA), a laptop, a personal computer (PC), or another mobile or non-mobile computing device.

The LiDAR system 1000 may include a memory that stores a program for operations performed by the processor 1700 and other data.

The LiDAR system 1000 may be used as a sensor for obtaining 3D information about an object in real time, thus being applicable to a self-driving device, e.g., an unmanned vehicle, a self-driving vehicle, a robot, a drone, etc. The LiDAR system 1000 may scan the object OBJ along the plurality of scanning lines at the same time, thereby analyzing the object OBJ at a high speed.

The OPA 1210 included in the LiDAR system 1000 may include an active layer having an optical property which is variable according to an electric signal applied thereto and a plurality of meta devices including nano structures of sub wavelengths located adjacent to the active layer, and such an exemplary structure will be described with reference to FIGS. 5 and 6.

Figure 5:
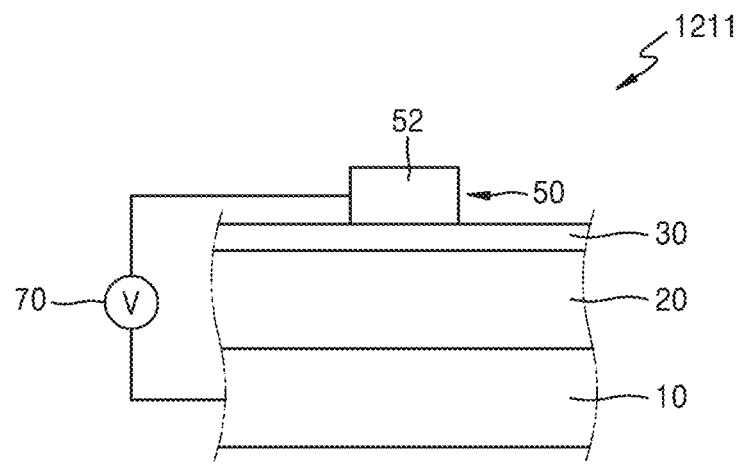
FIG. 5 is a cross-sectional view showing an exemplary detailed structure of an OPA adoptable in the LiDAR system illustrated in FIG. 2.
Figure 6:
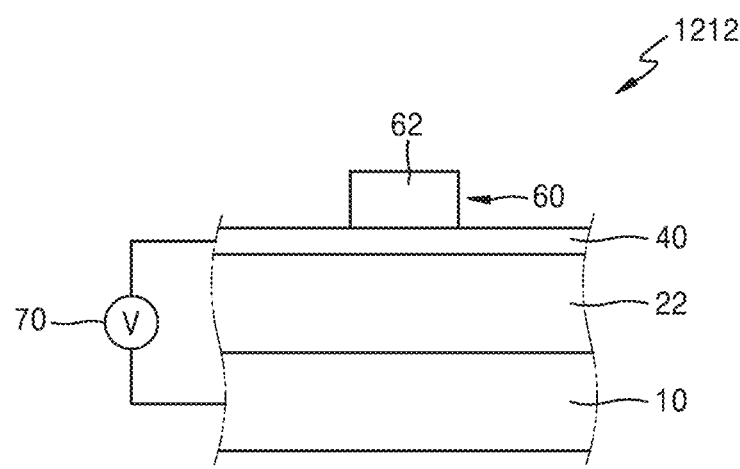
FIG. 6 is a cross-sectional view showing another exemplary detailed structure of an OPA adoptable in the LiDAR system illustrated in FIG. 2.

FIG. 5 is a cross-sectional view illustrating an exemplary structure of an OPA 1211 adoptable in the LiDAR system 1000 illustrated FIG. 2, and FIG. 6 is a cross-sectional view illustrating another exemplary structure of the OPA 1211 adoptable in the LiDAR system 1000 illustrated FIG. 2.

Referring to FIG. 5, the OPA 1211 may include an active layer 20, a conductive nano array layer 50 in which a conductive nano structure 52 is arrayed, an electrode layer 10 for applying a signal to the active layer 20, and a power source unit 70 applying a voltage between the electrode layer 10 and the conductive nano structure 52. The active layer 20 may include a material having optical properties that change with signal application. The active layer 20 may include, for example, a material having a dielectric constant that changes with application of an electric field. The nano array layer 50 may include a plurality of nano structures 52, though in the drawings, one nano structure 52 forming one channel is illustrated, and the number of channels may be determined to be a number appropriate to form a desired phase profile. An insulating layer 30 may be further disposed between the nano array layer 50 and the active layer 20.

The nano structure 52 may have a shape dimension of a sub-wavelength. Herein, the term "sub-wavelength" means dimensions smaller than an operational wavelength of the phase modulator 100, i.e., the incident light Li to be modulated. One dimension that forms the shape of the nano structure 52, e.g., at least one of a thickness, a width, and a length, may have a dimension of the sub-wavelength.

The conductive material adopted in the nano structure 52 may include a high-conductivity metallic material in which surface plasmon excitation may occur. For example, at least any one selected from among Cu, Al, Ni, Fe, Co, Zn, Ti, ruthenium (Ru), rhodium (Rh), palladium (Pd), white gold (Pt), silver (Ag), osmium (Os), iridium (Ir), and gold (Au) may be included, or an alloy including any one of them may also be included. A two-dimensional (2D) material having superior conductivity, such as graphene, or conductive oxide may be used.

The active layer 20 may include a material having optical characteristics that change with applications of an external signal. The external signal may be an electric signal. The active layer 20 may include transparent conductive oxide (TCO) such as indium tin oxide (ITO), indium zinc oxide (IZO), aluminum zinc oxide (AZO), gallium zinc oxide (GZO), or the like. Transition metal nitrites such as TiN, ZrN, HfN, or TaN may also be used for the active layer 20. Moreover, an electro-optic material having an effective dielectric constant that changes with application of an electric signal, i.e., LiNbO$_3$, potassium tantalate niobate (LiTaO$_3$ KTN), lead zirconate titanate (PZT), etc., may be used, and any of various polymer materials having electro-optic characteristics may be used.

The electrode layer 10 may be formed using any of various conductive materials. The electrode layer 10 may include at least one selected from among Cu, Al, Ni, Fe, Co, Zn, Ti, ruthenium (Ru), rhodium (Rh), palladium (Pd), white gold (Pt), silver (Ag), osmium (Os), iridium (Ir), and gold (Au). If the electrode layer 10 includes a metallic material, the electrode layer 10 may function as a reflective layer for reflecting light as well as applying a voltage. The electrode layer 10 may include transparent conductive oxide (TCO) such as indium tin oxide (ITO), indium zinc oxide (IZO), aluminum zinc oxide (AZO), gallium zinc oxide (GZO), or the like.

The nano structure 52 modulates a phase of light having a particular wavelength using surface plasmon resonance occurring in a boundary between the metallic material and a dielectric material, and the output phase value is related to the detailed shape of the nano structure 52. The output phase value may be adjusted by changing the optical properties of the active layer 20 by applying a voltage between the nano structure 52 and the electrode layer 10.

Referring to FIG. 6, the OPA 1212 may include an active layer 22, a nano array layer 60 in which a dielectric nano structure 62 is arrayed, an electrode layer 10 for applying a signal to the active layer 22, a conductive layer 40 disposed between the nano array layer 60 and the active layer 22, and a power source unit 70 that applies a voltage between the electrode layer 10 and the conductive layer 40.

The active layer 22 may include a material having optical properties that change with signal application, for example a material having a dielectric constant that changes with application of an electric field. The nano array layer 60 may include a plurality of nano structures 62, and in the drawings, one nano structure 62 forming one channel is illustrated.

The active layer 22 may include an electro-optic material having a refractive index that changes according to changes to an effective dielectric constant that, in turn, changes with application of an electric signal. As the electro-optic material, LiNbO$_3$, potassium tantalate niobate (LiTaO$_3$ KTN), lead zirconate titanate (PZT), etc., may be used, and various polymer materials having electro-optic characteristics may also be used.

The nano structure 62 may have a shape dimension of a sub-wavelength. The nano structure 62 may include a dielectric material to modulate a phase of light having a particular wavelength by using Mie resonance caused by displacement current. To this end, the nano structure 62 may include a dielectric material having a refractive index higher than that of the active layer 22, for example, a material having a refractive index higher than the highest value in a range within which the refractive index of the active layer 22 changes by application of a voltage. The phase value output by the nano structure 62 is related to the detailed structure of the nano structure 62. The output phase value from the nano structure 62 may be adjusted by a change of the optical properties of the active layer 22 due to a voltage applied between the conductive layer 40 and the electrode layer 10.

In FIGS. 5 and 6, a description has been made of exemplary structures of the OPAs 1211 and 1212 that include metal devices including sub wavelength- or nano-structures, respectively, and the OPA 1210 adoptable in the LiDAR system 1000 illustrated in FIG. 2 is not limited to the configurations illustrated in FIGS. 5 and 6. Modified structures from FIGS. 5 and 6 may be adopted in the OPA 1210.

Figure 7:
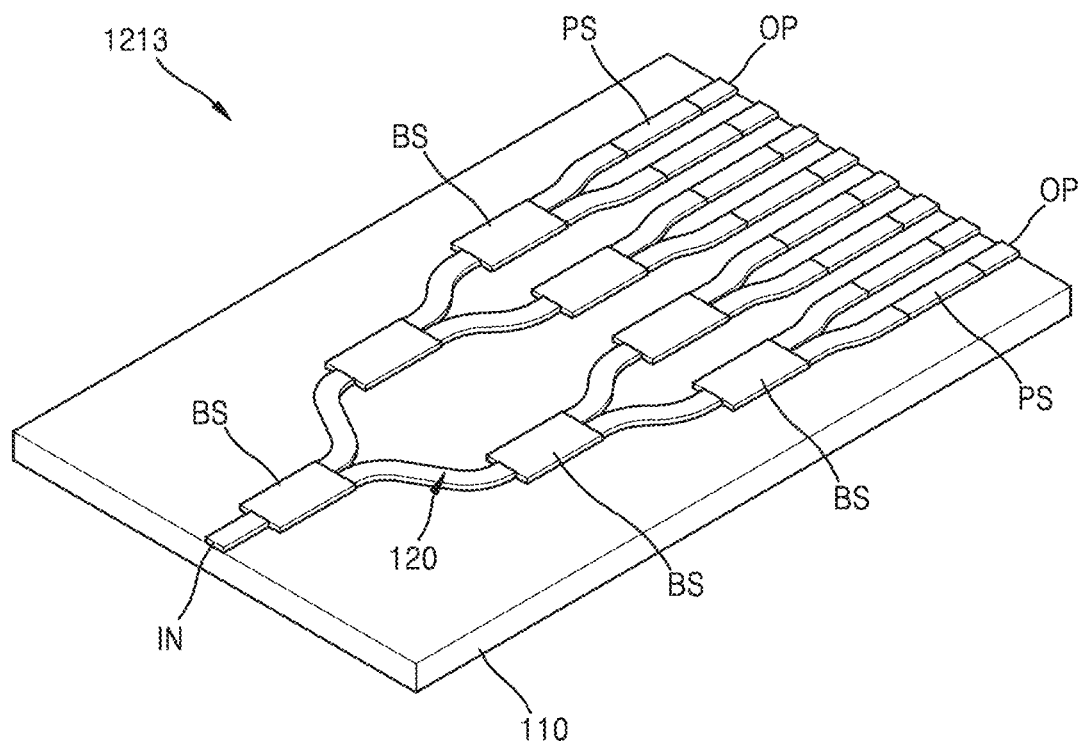
FIG. 7 is a perspective view showing another exemplary detailed structure of an OPA adoptable in the LiDAR system illustrated in FIG. 2.

FIG. 7 is a perspective view showing another exemplary detailed structure of an OPA 1213 adoptable in the LiDAR system 1000 illustrated in FIG. 2.

Referring to FIG. 7, the OPA 1213 may include a light waveguide 120 that splits input light to a plurality of paths and outputs the light through a plurality of output ends OP and a phase retarder PS that adjusts phase delay in each of the plurality of paths.

The OPA 1213 may be manufactured on a silicon substrate 110 using silicon photonics. Beam splitters BS are provided at branch points at which the light waveguide 120 branches off, such that light incident into an input end IN is emitted through the plurality of output ends OP.

A phase retarder PS is provided in each of the plurality of paths toward the plurality of output ends OP. By adjusting a signal applied to the phase retarder PS, a phase delay degree in each path may be regulated. By changing a refractive index of a partial area of the light waveguide 120 adjacent to an input signal based on the input signal, the phase retarder PS may delay a phase of light passing through that refractive-index-changed area of the light waveguide 120. The phase retarder PS may be a heater that is provided on the light waveguide 120, is electrically heated, and heats a partial area of the light waveguide 120.

The phase retarder PS is not limited to the aforementioned structure, and may employ any of various structures capable of controlling a phase delay degree by adjusting the degree of optical property change in a partial area of the light waveguide 120 based on an applied signal.

While an 8-channel structure has been illustrated in which light incident through the input end IN is split and transmitted through 8 output ends OP, the number of output ends OP may be determined to be a number appropriate to form a desired phase profile, without being limited to the illustration.

Figure 8:
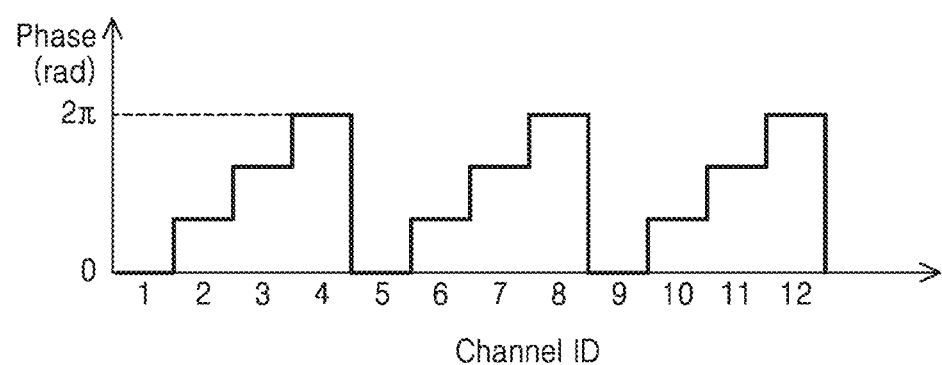
FIG. 8 shows a phase profile applicable to an OPA of the LiDAR system illustrated in FIG. 2.
Figure 9:
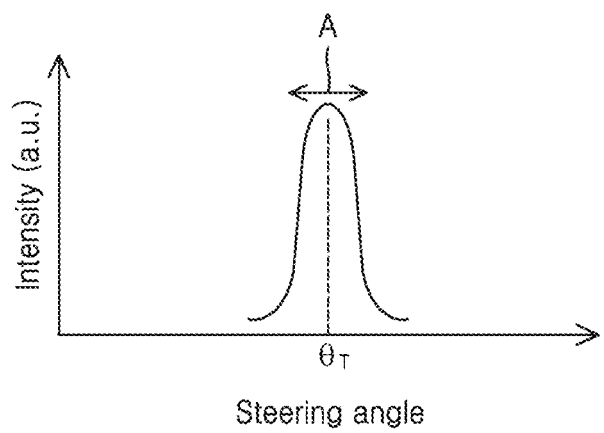
FIG. 9 is a graph showing exemplary angular distribution of irradiated light formed by the phase profile shown in FIG. 8.
Figure 10:
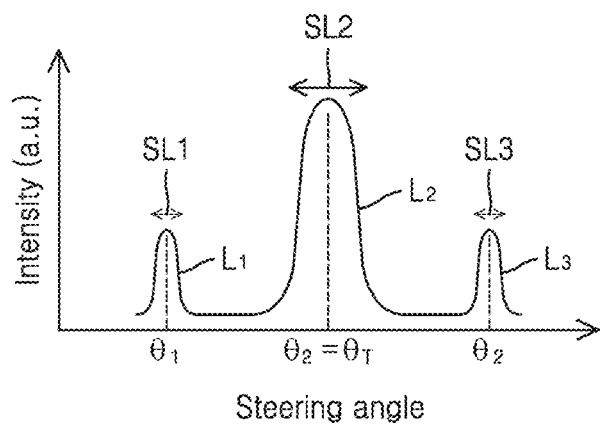
FIG. 10 is a graph showing another exemplary angular distribution of irradiated light formed by the phase profile shown in FIG. 8.

FIG. 8 shows a phase profile applicable to the OPA 1210 of the LiDAR system 1000 illustrated in FIG. 2. FIGS. 9 and 10 are graphs showing exemplary angular distributions of irradiated light formed by the phase profile shown in FIG. 8.

Referring to FIG. 8, a plurality of phase values are repeated in a stepwise form from 0 to 2π as a phase value applied to each channel. Implementation of a beam steering angle may be possible when a plurality of adjacent channels show linearly increasing phase values.

A steering angle $\theta_T$ implemented by such a phase profile is determined as shown in Equation (1).

$$\sin\theta_T = \frac{\Delta\phi}{2\pi}\frac{\lambda}{d} \qquad (1)$$

Herein, Δφ indicates a phase difference between adjacent channels, λ indicates a wavelength of incident light, and d indicates a channel width.

Referring to FIG. 9, based on the phase profile of FIG. 8, angular distribution of irradiated light shows an intensity distribution having a peak value at a target steering angle $\theta_T$. By adjusting $\theta_T$ according to Equation (1), an object may be scanned along an indicated direction A.

As shown in FIG. 9, an irradiated-light waveform showing one main peak corresponds to a case in which a sub-wavelength dimension used in an OPA. For example, when an interval or shape dimension of nano structures included in the OPA is smaller than a wavelength of incident light, the irradiated-light waveform as shown in FIG. 9 is formed.

Irradiated-light distribution based on an OPA using a larger dimension than a wavelength of incident light may be as shown in FIG. 10.

Referring to FIG. 10, angular distribution of irradiated light has a peak value at each of $\theta_1$, $\theta_2$, and $\theta_3$. Angular distribution of light intensity includes a main lobe based on $L_2$ and side lobes based on $L_1$ and $L_3$. $\theta_2$ is the intended target steering angle $\theta_T$. The main lobe based on $L_2$ may be referred to as 0-order light irradiated from the OPA, and the side lobes based on $L_1$ and $L_3$ may be referred to as ±1-order light. Light distribution having peak values at $\theta_1$, $\theta_2$, and $\theta_3$, respectively, moves as a signal applied to a signal input unit is adjusted, and scanning lines in arrow directions indicated by SL1, SL2, and SL3 may be formed on the object.

Although two side lobes are illustrated in FIG. 10, this illustration is an example, and side lobes corresponding to ±2-order light, ±3-order light, . . . , ±n-order light may be further included in order of a decreasing peak value and may be used as scanning light.

The LiDAR system 1000 according to an exemplary embodiment uses irradiated light corresponding to a side lobe as light for analyzing an object, thereby scanning and analyzing the object at a high speed.

Figure 11:
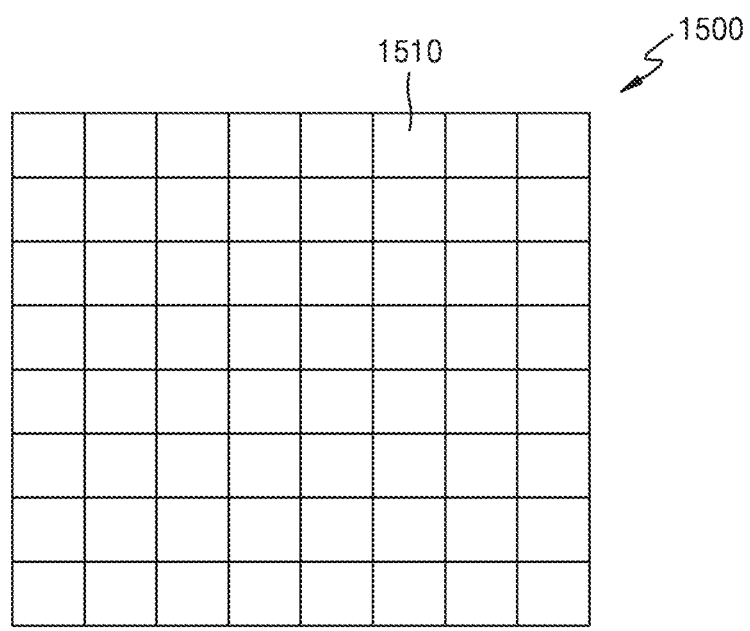
FIG. 11 is a plan view showing that the receiver employed in the LiDAR system illustrated in FIG. 2 includes an array of a plurality of light detection elements.
Figure 12:
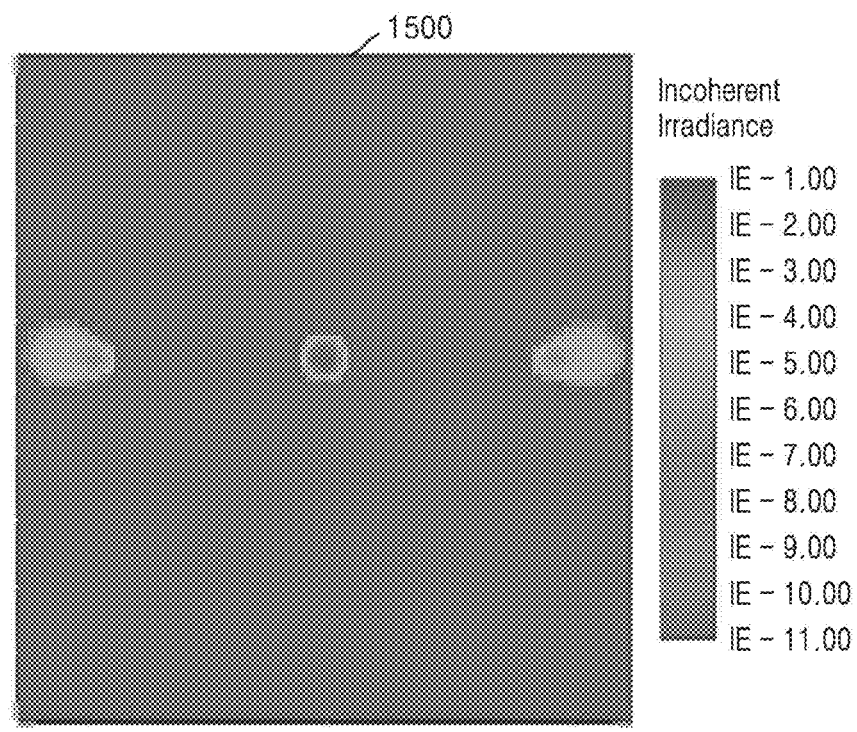
FIG. 12 is a graph showing light distribution in which irradiated light in a form as shown in FIG. 10 is irradiated onto an object and reflected from the object, and is then detected by a receiver.

FIG. 11 is a plan view showing that the receiver employed in the LiDAR system illustrated in FIG. 2 includes an array of a plurality of light detection elements, and FIG. 12 is a graph showing light distribution in which irradiated light in a form as shown in FIG. 10 is irradiated onto an object and reflected from the object, and is then detected by a receiver.

The receiver 1500 may include an array of the plurality of light detection elements 1510. The plurality of light detection elements 1510 separately sense light incident thereon, and thus may identify light, from among the light irradiated onto an object, from which the reflected light comes, based on the position distribution of a signal detected by the receiver 1500.

Referring to FIG. 12, light detected in a central area of the receiver 1500 having the highest intensity comes from 0-order light and light detected in side areas come from −1-order light and +1-order light, respectively.

While it is illustrated in FIG. 12 that 0-order light and ±1-order light may be identified from the position distribution of light detected by the receiver 1500, the present disclosure is not limited to this illustration. A method of analyzing a time difference in light detection of the receiver 1500 may be used. Alternatively, position distribution analysis of detected light and time difference analysis may be used together. For example, when light is irradiated onto an object in a plurality of directions, a traveling distance light to the object may vary based on the shape of the object and thus, a time of arrival of reflected light at the receiver 1500 may also differ. By analyzing such a time difference, a position of the object from which light comes may be determined.

The description made with reference to FIGS. 8 through 10 assumes that channels of an OPA implement a phase value from 0 to 2π as desired. However, when an OPA is implemented with meta devices as shown in FIGS. 5 and 6, a phase value close to 2π is difficult to implement, and when a light waveguide is employed as shown in FIG. 7, the entire structure may become excessively bulky in order to implement the phase value close to 2π.

If the phase value close to 2π is not implemented and a phase limit value is lower than 2π, angular distribution of irradiated light may have a plurality of peak values at unintended angles as well as a peak value at an intended angle. Peak values at unintended angles may be noise, and to reduce this problem, a binary phase profile may be used.

Figure 13:
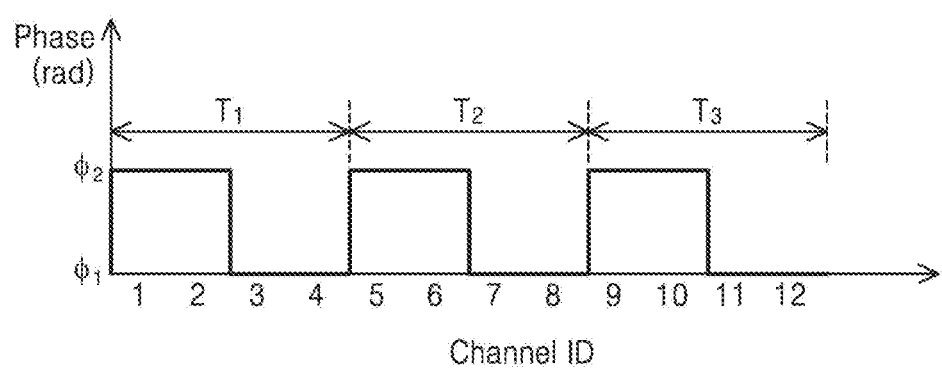
FIG. 13 shows a binary phase profile applicable to an OPA employed in the LiDAR system illustrated in FIG. 2.

FIG. 13 shows a binary phase profile applicable to an OPA employed in the LiDAR system 1000 illustrated in FIG. 2.

The binary phase profile indicates that a phase profile to be implemented in an OPA is configured with only two phase values $\varphi_1$ and $\varphi_2$.

Periods $T_k$ (k=1, 2, . . . ) in which an arranged pattern of the two phase values $\varphi_1$ and $\varphi_2$ is repeated are set. Desired optical performance may be adjusted by an average value $<T_k>$ of the periods.

A value of the periods $T_k$ in which the arranged pattern of the two phase values $\varphi_1$ and $\varphi_2$ is repeated has a discrete value, such as an integer multiple of a channel size d, whereas the average value $<T_k>$ of the periods may have any of various continuous values. Thus, through arrangement for setting the periods $T_k$ to different values, that is, through adjustment of the average value $<T_k>$, instead of arrangement for adjusting the periods $T_k$ to the same value, adjustment of desired optical performance may be facilitated.

If a binary phase profile is used, when a difference between two phase values, $|\varphi_1-\varphi_2|$, is π, 2d in Equation (1) may be substituted to an average value $<T_k>$ of repetition intervals in the arranged pattern of the two phase values $\varphi_1$ and $\varphi_2$, as below.

$$\sin\theta_T = \frac{\lambda}{\langle T_k \rangle} \quad (2)$$

When the steering angle $\theta_T$ is adjusted based on Equation (2), adjustment of $<T_k>$ having a continuous value with the use of only two phase values $\varphi_1$ and $\varphi_2$ is employed, thereby expressing various values of $\theta_T$. In this way, scanning in a desired angle range may be easily implemented.

Figure 14:
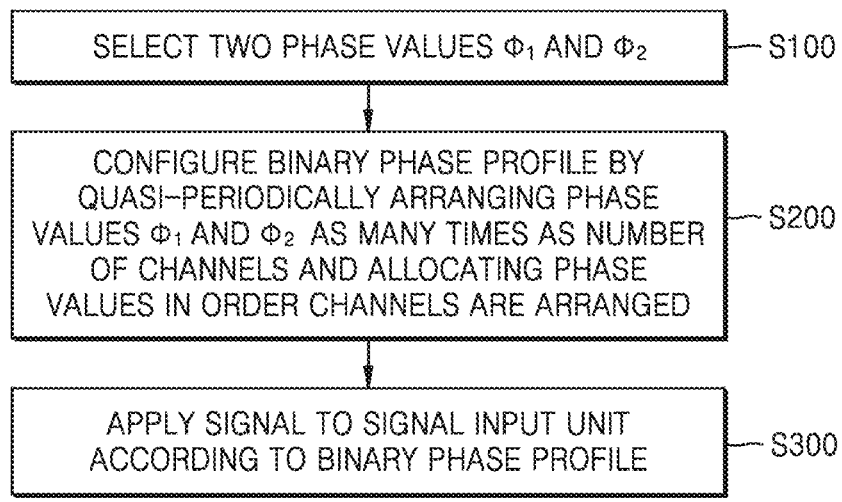
FIG. 14 is a flowchart illustrating a method in which the LiDAR system illustrated in FIG. 2 configures the binary phase profile as shown in FIG. 13 and drives a beam steering device.
Figure 15:
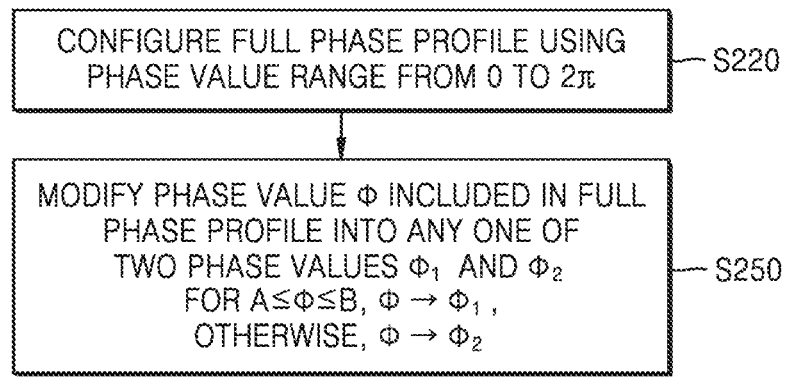
FIG. 15 is a flowchart illustrating in detail an operation of configuring the binary phase profile in the flowchart illustrated in FIG. 14.
Figure 16:
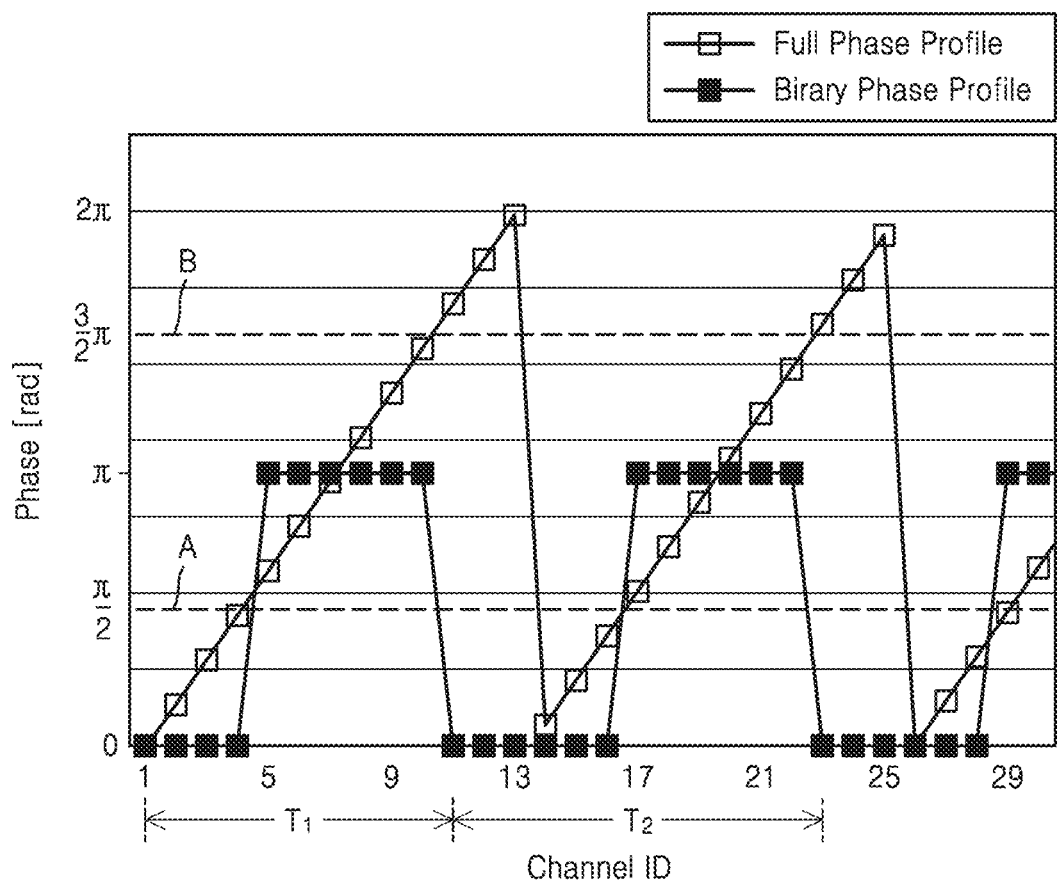
FIG. 16 shows an example in which the binary phase profile is configured from a full phase profile in the flowchart illustrated in FIG. 15.

FIG. 14 is a flowchart illustrating a method in which the LiDAR system 1000 illustrated in FIG. 2 configures the binary phase profile as shown in FIG. 13 and drives the beam steering device 1200, and FIG. 15 is a flowchart illustrating in detail an operation of configuring the binary phase profile in the flowchart illustrated in FIG. 14. FIG. 16 shows an example in which the binary phase profile is configured from a full phase profile in the flowchart illustrated in FIG. 15.

Referring to FIG. 14, the two phase values $\varphi_1$ and $\varphi_2$ to be used as phase values in a plurality of channels provided in the OPA 1210 are selected in operation S100. The two phase values $\varphi_1$ and $\varphi_2$ are phase values that may be implemented in each channel included in a phase modulation active device and may be between 0 to 2π. Considering that a phase limit may exist, the two phase values $\varphi_1$ and $\varphi_2$ may be selected as smaller values than a limit value that each channel may have. A difference between the two phase values, $|\varphi_1-\varphi_2|$, may be $\pi$. For example, $\varphi_1$ and $\varphi_1+\pi$ may be selected as the two phase values. The two phase values may be 0 and $\pi$, respectively.

To configure the binary phase profile, the selected two phase values $\varphi_1$ and $\varphi_2$ are arranged in a quasi-periodic manner as many times as the number of channels of the OPA 1210 and are allocated in an order in which a plurality of channels are arranged, in operation S200. Herein, the quasi-periodic arrangement means that not all the periods $T_k$ in which the two phase values $\varphi_1$ and $\varphi_2$ are repeated are identical.

As in the binary phase profile shown in FIG. 13, by repeating a process of setting the phase value $\varphi_1$ for one or more channels located adjacent to each other from among the plurality of channels provided in the OPA 1210 and setting the phase value $\varphi_2$ for the next one or more channels located adjacent to each other, the periods $T_k$ (k=1, 2, . . . ) in which the arranged pattern of the two phase values $\varphi_1$ and $\varphi_2$ is repeated may be set. In this way, the average value $<T_k>$ of the periods may have a desired value.

Next, to implement the configured phase profile in the OPA 1210, a signal is applied to the signal input unit 1230 in operation S300.

Referring to FIG. 15, to configure the binary phase profile, a full phase profile is first configured in operation S220. The full phase profile is a phase profile that uses the entire phase value range of 0 to $2\pi$ to implement desired optical performance.

Next, phase values included in the full phase profile are modified into any one of the two phase values $\varphi_1$ and $\varphi_2$ in operation S250. For example, the phase value may be modified to be $\varphi_1$ if a phase value $\varphi$ shown in the full phase profile satisfies a continuous first range like $A \leq \varphi \leq B$, and otherwise, the phase value may be modified to be $\varphi_2$.

FIG. 16 shows an example in which the full phase profile is modified into a binary phase profile. In this graph, modification into the binary phase profile is performed according to a rule in which A is $\pi/2$, B is $3\pi/2$, $\varphi_1$ is 0, and $\varphi_2$ is $\pi$. That is, if the phase value included in the full phase profile is $\pi/2 \leq \varphi \leq 3\pi/2$, the phase value is modified to be $\pi$; otherwise, the phase value is modified to be 0.

Figure 17:
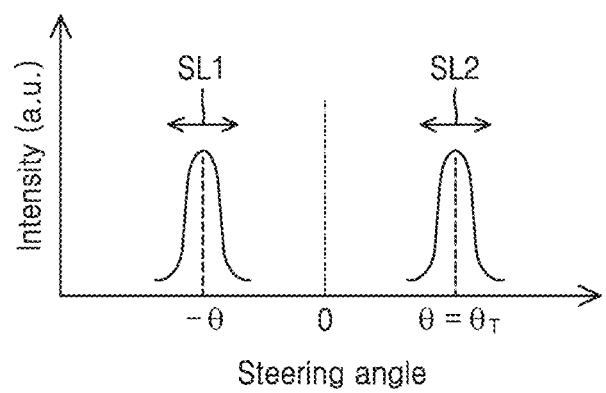
FIG. 17 is a graph showing angular distribution of irradiated light formed by the binary phase profile shown in FIG. 13.
Figure 18:
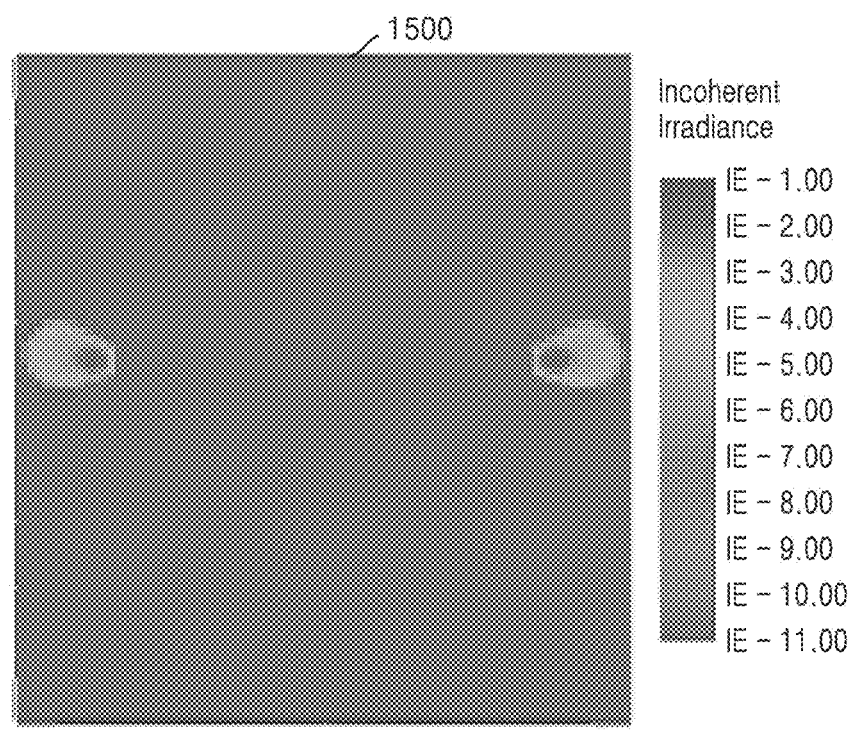
FIG. 18 is a graph showing light distribution in which irradiated light in a form as shown in FIG. 17 is irradiated onto an object and reflected from the object, and is then detected by a receiver.

The foregoing rule is only an example, and to adjust the average value $<T_k>$ of the periods, other modified rules may also be used FIG. 17 is a graph showing angular distribution of irradiated light formed based on the binary phase profile shown in FIG. 13, and FIG. 18 is a graph showing light distribution in which irradiated light in a form as shown in FIG. 17 is irradiated onto an object and reflected from the object, and is then detected by a receiver.

Referring to FIG. 17, angular distribution of irradiated light from the OPA 1210 has peak values at $\theta$ and $-\theta$ based on the binary phase profile. $\theta$ corresponds to $\theta_T$ determined by Equation (2). In this way, light, ±1-order light has peak values at $\theta_T$ and $-\theta_T$. The two graphs correspond to angular distribution of 1-order light and −1-order light, respectively, and the two peak values are substantially equal to each other. In the binary phase profile, light having two equal peak values may be implemented due to symmetry of the binary phase profile. In addition, a difference between the two phase values, $|\varphi_1-\varphi_2|$, is set to $\pi$, such that 0-order light is not substantially generated. Light distribution having peak values at $\theta_T$ and $-\theta_T$, respectively, moves as a signal applied to the signal input unit is adjusted, and scanning lines in arrow directions indicated by SL1 and SL2 may be formed on the object.

Referring to FIG. 18, the light detected by both sides of the receiver 1500 may be based on +1-order light and −1-order light, and light, of the light irradiated onto the object, which is reflected and then detected, may be identified based on position distribution.

For the identification, analysis of a time difference in light detection by the receiver 1500 as well as analysis of position distribution may also be used. Alternatively, position distribution analysis of detected light and time difference analysis may be used together. For example, when light is irradiated onto an object in a plurality of directions, a traveling distance the light to the object may vary according to the shape of the object and thus, a time of arrival of reflected light at the receiver 1500 may also vary. By analyzing such a time difference, a position of the object from which light comes may be determined.

As such, if an object is scanned using light having two similar peak values and different directions and then light is detected, information about the object may be analyzed in a convenient and fast way.

With the LiDAR system and the method of driving the same according to one or more exemplary embodiments, the beam steering device irradiates light toward the object in the plurality of directions and the receiver identifies the light to detect light reflected from the object, thereby performing analysis with respect to the object in a faster way.

So far, exemplary embodiments have been described and illustrated in the attached drawings to help understanding of the present disclosure. However, it should be understood that these embodiments are intended to merely describe the present disclosure and do not limit the present disclosure. It also should be understood that the present disclosure is not limited to the illustrated and provided description. This is because various modifications may be made by those of ordinary skill in the art.

What is claimed is:

1. A light detection and ranging (LiDAR) system comprising:
  a light source;
  a beam steering device comprising an optical phase array (OPA) that comprises a plurality of channels, the plurality of channels being respectively configured to modulate a phase of light from the light source and to output a plurality of light beams in a plurality of directions, simultaneously;
  a receiver comprising a plurality of light detection elements configured to respectively receive the plurality of light beams radiated onto an object in the plurality of directions from the beam steering device and reflected from the object; and
  a processor configured to control the beam steering device to scan the object by using a plurality of scanning lines simultaneously, the plurality of scanning lines being formed by adjusting each of the plurality of directions, the processor being configured to analyze a time difference or a spatial distribution of the plurality of light beams respectively received by the plurality of light detection elements included in the receiver and thereby individually process the plurality of light beams radiated onto the object in the plurality of directions,
  wherein the beam steering device comprises a signal input unit configured to apply a modulation signal to each of the plurality of channels,
  wherein the processor further comprises a phase setter configured to configure a phase profile implemented by the OPA and to control the signal input unit based on the phase profile to control the plurality of directions, wherein the phase setter is further configured to configure a binary phase profile in which the plurality of directions comprise a first direction in which +1-order light output from the OPA is directed, and a second direction in which −1-order light output from the OPA is directed, and wherein the phase setter is further configured to configure the binary phase profile in which a phase value implemented in each of the plurality of channels of the beam steering device is one of a first phase value $\varphi_1$ and a second phase value $\varphi_2$.

2. The LiDAR system of claim 1, wherein the phase setter is further configured to configure the binary phase profile by arranging the first phase value $\varphi_1$ and the second phase value $\varphi_2$ in a quasi-periodic manner as many times as a number of channels and to allocate the first phase value $\varphi_1$ and the second phase value $\varphi_2$ in an order in which the plurality of channels are arranged.

3. The LiDAR system of claim 2, wherein the phase setter is further configured to configure the binary phase profile by repeating a process of setting the first phase value $\varphi_1$ for one or more channels located adjacent to each other from among the plurality of channels and setting the second phase value $\varphi_2$ for next one or more channels located adjacent to each other such that an average value of periods in which an arranged pattern of the first phase value $\varphi_1$ and the second phase value $\varphi_2$ is repeated satisfies a predetermined value.

4. The LiDAR system of claim 3, wherein the phase setter is further configured to configure the binary phase profile such that the first direction and the second direction determined by angles θ and −θ, respectively, defined by:

$$\sin\theta = \frac{\lambda}{\langle T_k \rangle}$$

wherein λ is a wavelength of incident light, $T_k$ is a $k^{th}$ period in which the arranged pattern of the first phase value $\varphi_1$ and the second phase value $\varphi_2$ is repeated, and $\langle T_k \rangle$ is an average value of the periods.

5. The LiDAR system of claim 1, wherein the phase setter is further configured to configure the binary phase profile by configuring a full phase profile that uses an entire phase value range from 0 to 2π such that a direction of the +1-order light becomes a desired direction, and modifying each of phase values of the full phase profile into any one of the first phase value $\varphi_1$ and the second phase value $\varphi_2$.

6. The LiDAR system of claim 5, wherein the phase setter is further configured to configure the binary phase profile by modifying phase values within a set range into the first phase value $\varphi_1$ and modifying phase values beyond the set range into the second phase value $\varphi_2$.

7. The LiDAR system of claim 6, wherein a difference between the first phase value $\varphi_1$ and the second phase value $\varphi_2$ is π.

* * * * *